United States Patent [19]

Rausch

[11] Patent Number: 4,485,842
[45] Date of Patent: Dec. 4, 1984

[54] BALANCED PRESSURE VALVE

[75] Inventor: Georg Rausch, Lohr, Fed. Rep. of Germany

[73] Assignee: Mannesmann Rexroth GmbH, Fed. Rep. of Germany

[21] Appl. No.: 466,668

[22] Filed: Feb. 15, 1983

[30] Foreign Application Priority Data

Feb. 26, 1982 [DE] Fed. Rep. of Germany ....... 3207080

[51] Int. Cl.³ .................... F16K 31/383; G05D 16/00
[52] U.S. Cl. ..................................... 137/489; 137/495
[58] Field of Search ................................. 137/489, 495

[56] References Cited

U.S. PATENT DOCUMENTS

| 2,855,947 | 10/1958 | Lee | 137/489 X |
| 3,250,293 | 5/1966 | Adams | 137/489 X |
| 3,373,763 | 3/1968 | Smilges | 137/489 X |
| 3,884,262 | 5/1975 | Assembergs | 137/489 |
| 4,172,466 | 10/1979 | Pattarini | 137/489 X |

Primary Examiner—Alan Cohan
Attorney, Agent, or Firm—Harness, Dickey & Pierce

[57] ABSTRACT

In a balanced pressure valve with a switching valve for switching over to pressureless circulation, restrictors are provided in the line carrying the system pressure in such a way that the opening motion of the main piston of the balanced pressure valve is heavily damped, and the throttle losses in the bypass line leading from the line carrying the system pressure via the switching valve to the tank are very low when the main piston is open, and with this also the resistance of the main flow via the main piston is correspondingly low.

2 Claims, 1 Drawing Figure

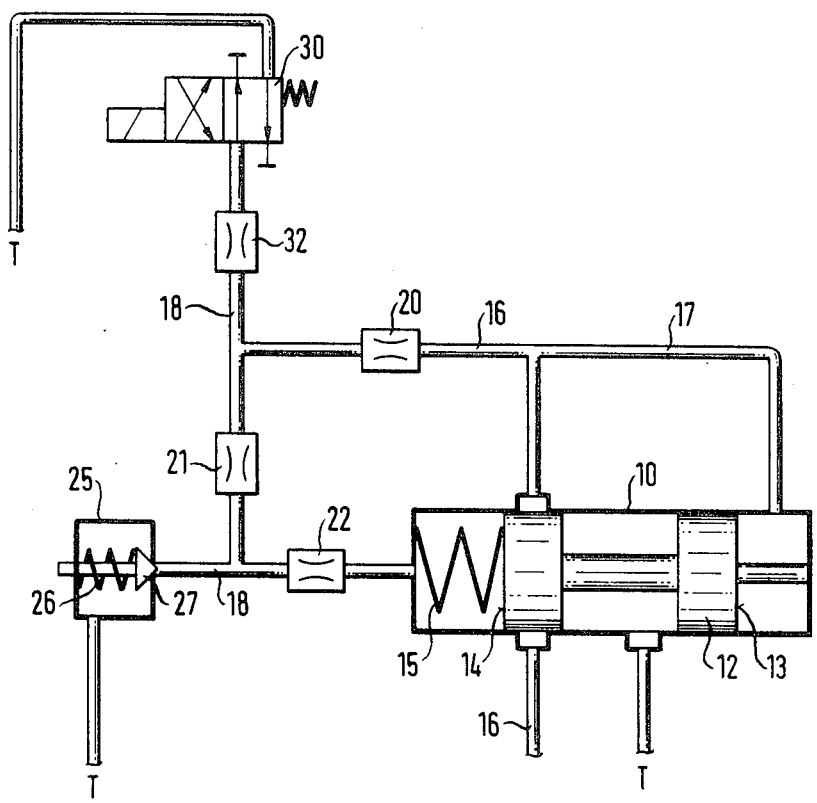

BALANCED PRESSURE VALVE

BACKGROUND OF THE INVENTION

The invention relates to balanced pressure valves of the kind comprising: a spring-loaded main piston, one face of which is acted upon directly, and the other, spring-loaded face of which is acted upon via two restrictors, located one behind the other, by the system pressure; a servo valve having a spring-loaded operating element by which the space between the two restrictors can be connected with exhaust when the system pressure exceeds the pressure set on the operating element, whereby, by means of the pressure differential acting on the main piston, the latter is displaced and a connection is established from a line carrying the system pressure to exchaust; and a switching valve by means of which a connection can be established from the line carrying the system pressure, via a further restrictor, to exhaust whereby the pressure valve can be switched over to pressureless circulation.

Such pressure valves serve as relief-valves for the setting of a specified system pressure. While directly controlled relief-valves find application for smaller flow quantities, balanced relief-valves are required for larger flow quantities. The servo valve is a directly controlled pressure valve, upon the operating member of which the system pressure acts. If and when the servo valve opens, then a pressure gradient arises between the two faces of the main piston, as a result of which the main piston is displaced and thereby allows excess fluid to flow away out of the system to the tank.

The balanced pressure valve includes additionally, in known manner, a switching valve via which the line carrying the system pressure can have a direct connection set up to the tank. By this means the pressure valve can for example be switched over to the pressureless starting-up of a pump or, at times of stoppage of a hydraulic installation, to pressureless circulation and hence low power loss.

If now, for example, through electromagnetic activation of the switching valve, the pressure valve is switched over to pressureless circulation, then the volume of fluid displaced by the main piston of the pressure valve is led via a restrictor to the switching valve and thus to the tank, so that the opening motion of the main piston s damped, and thereby very high and steep pressure differentials in the installation are avoided. The greater the throttle effect of the damping restrictor, the more powerfully the opening motion of the main piston is damped. On the other hand, however, there is also a constant, relatively low quantity of flow via the restrictor and the switching valve to the tank. The greater the throttle effect of the restrictor, the higher is the rise in pressure upstream from the restrictor, as a result of which the main piston tries to shut, so that the throttle losses in pressureless circulation are raised.

The problem which forms the basis of the present invention consists in configuring the above-mentioned pressure valve in such a way that, on switching to pressureless circulation, good damping of the main piston of the pressure valve is effected, and the throttle losses are lowered.

SUMMARY OF THE INVENTION

According to the invention, in a balanced pressure valve of the kind first referred to, the switching valve is connected to the line carrying the system pressure, upstream from the two restrictors, and a supply restrictor is provided upstream from the junction point in the line carrying the system pressure.

In this way, on switching to pressureless circulation, the volume of fluid displaced by the main piston in its opening motion is conducted, via the two restrictors disposed one behind the other, into the line carrying the system pressure, between the two additional restrictors. In this space between the two additional restrictors a higher level of pressure reigns than in the outlet line leading to the tank, so that on switching to pressureless circulation the volume of fluid displaced by the main piston flows away relatively slowly, with the result that the time of opening of the main piston is lengthened. In view of this, a very gentle unloading of the system pressure on to the tank pressure is obtained.

Furthermore, the flow cross-section of the additional restrictor provided upstream from the junction point may be so dimensioned, in relation to the restrictor connected in series with the switching valve, that on switching to pressureless circulation a low circulation pressure is attained. Thereby the throttle losses in pressureless circulation are able to be appreciably reduced.

BRIEF DESCRIPTION OF THE DRAWING

An embodiment of the invention is described below with reference to the accompanying drawing, in which a balanced pressure valve with a switching valve is represented schematically.

DETAILED DESCRIPTION OF THE PREFERRED EMBODIMENT

In a bore of a main valve 10 a main piston 12 is displaceable, by means of which there is controlled a connection from a line 16, conducting the system pressure, to a line T leading to the tank.

The right-hand face 13 of the main piston 12 is directly acted upon by the system pressure via a branch line 17 leading from the line 16, while the other face 14 of the main piston 12, loaded by a spring 15, is acted upon by the system pressure out of the line 16 via a branch line 18, in which three restrictors 20, 21 and 22 are fitted. A servo valve 25 is connected between restrictors 21 and 22 in such a way that the pressure in the line 18 operates upon its operating element 27, which is loaded with a spring 26.

In a state of rest, the pressures on both faces 13 and 14 of the main piston 12 are equal. By means of equal-sized surfaces the main piston 12 is pressure-equalized. The spring 15 holds the main piston in the starting position shown. The minimum pressure of response of the pressure valve is determined by the spring 26 of the servo valve 25.

If the system pressure reaches the value set on the servo valve 25, then the operating element 27 opens and fluid flows out of the line 16 via the restrictor 21 to the tank T. At the restrictor 21 a pressure gradient arises, which is also operative between the two faces 13, 14 of the main piston. If the force from the pressure gradient times piston surface area exceeds the force of the spring 15, then the main piston 12 is displaced to the left and allows excess fluid to flow away out of the line 16 to the tank T.

The opening motion of the main piston 12 is damped by the restrictor 22, because the fluid displaced by the piston flows away to the tank T via the restrictor 22 and the operating element 27.

If the pressure valve 10, 25 is to be switched to pressureless circulation, then a switching valve 30 is connected, via a further restrictor 32, to the line 18 between restrictors 20 and 21. In the starting position shown, the switching valve 30 shuts off the line 18. If on the other hand the switching valve is switched over to the pressureless circulation position, then the space in front of the face 14 of the main piston 12 is connected to the tank T via restrictors 21, 22 and 32. The quantity of fluid displaced during the opening motion of the main piston 12 experiences a throttling not only at the damping restrictor 22 but also at the feed restrictor 21, so that an appreciable damping is attained and the opening motion of the main piston 12 is slowed down.

Apart from this, the volume of fluid displaced by the main piston 12 arrives, after flowing through restrictor 21, at a pressure which lies between the system pressure and the tank pressure and is governed by the cross-section ratio of the two restrictors 20 and 32. By this means the pressure gradient at the restrictors 21 and 22 is reduced, through which a further lengthening of the time of opening of the main piston 12 is obtained. The system pressure is therefore unloaded on to the tank pressure very gently.

Further, the aperture cross-section of the supply restrictor 20 is able to be so dimensioned, in relation to the restrictor 32 connected in series with the switching valve 30, that the quantity of control fluid flowing away via the line 18 and the switching valve 30 to the tank T meets only a low resistance when the main piston is open, so that a low circulation pressure is set up. As a result, there is no rise in pressure in the line 18, which could act upon the main piston 12 in the direction of closure. The main piston 12 remains in the opened position, and the throttle losses in the installation during pressureless circulation are very low.

In this connection it is pointed out that, even in known balanced pressure valves with a switching valve for switching over to pressureless circulation, the restrictors 21, 22 and 32 are provided. However, in the conventional arrangement the switching valve is then connected via the restrictor 32 to the space between restrictors 21 and 22, and the restrictor 20 is not present. With this arrangement, when the switching valve is switched over to pressureless circulation, the volume of fluid displaced by the main piston 12 is led away to the tank T merely via restrictors 22 and 32. This has the disadvantage that the unloading of pressure takes place with only slight damping. If however one narrows the cross-sections of the restrictors, then the damping performance on switching to pressureless circulation is indeed improved, but on the other hand the circulation pressure is raised, so that appreciable throttle losses arise.

I claim:

1. Balanced pressure valve for the setting of a specified system pressure, comprising: a spring-loaded main piston, one face of which is acted upon directly, and the other, spring-loaded face of which is acted upon via two restrictors, located one behind the other, by the system pressure; a servo valve having a spring-loaded operating element by which the space between the two restrictors can be connected with the exhaust when the system pressure exceeds the pressure set on the operating element, whereby, by means of the pressure differential acting on the main piston, the latter is displaced and a connection is established from a line carrying the system pressure to exhaust; and a switching valve by means of which a connection can be established from the line carrying the system pressure, via a further restrictor, to exhaust whereby the pressure valve can be switched over to pressureless circulation; the switching valve being connected to the line carrying the system pressure, upstream from the two restrictors, and a supply restrictor being provided upstream from the junction point in the line carrying the system pressure.

2. Balanced pressure valve in accordance with claim 1, wherein the flow cross-section of the supply restrictor provided upstream from the junction point, and of the restrictor connected in series with the switching valve, are so dimensioned that the pressure in the line between the restrictors is relatively low.

* * * * *